(12) United States Patent
Sekiguchi

(10) Patent No.: US 11,279,102 B2
(45) Date of Patent: Mar. 22, 2022

(54) PUNCTURE REPAIR FLUID CONTAINER AND PUNCTURE REPAIR KIT

(71) Applicant: The Yokohama Rubber Co., LTD., Tokyo (JP)

(72) Inventor: Takumi Sekiguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/970,338

(22) PCT Filed: Dec. 21, 2018

(86) PCT No.: PCT/JP2018/047264
§ 371 (c)(1),
(2) Date: Aug. 14, 2020

(87) PCT Pub. No.: WO2019/159537
PCT Pub. Date: Aug. 22, 2019

(65) Prior Publication Data
US 2021/0078269 A1    Mar. 18, 2021

(30) Foreign Application Priority Data
Feb. 15, 2018   (JP) .............................. JP2018-025159

(51) Int. Cl.
*B29C 73/16*   (2006.01)
*B29C 73/02*   (2006.01)
(Continued)

(52) U.S. Cl.
CPC .......... *B29C 73/166* (2013.01); *B29C 73/025* (2013.01); *B29C 73/24* (2013.01); *B29L 2030/00* (2013.01)

(58) Field of Classification Search
CPC ..... B29C 73/166; B29C 73/025; B29C 73/24; B60S 2030/00
(Continued)

(56) References Cited

U.S. PATENT DOCUMENTS 10,786,958 B2 * 9/2020 Lam ..................... B60C 25/16
2010/0108185 A1 * 5/2010 Chou .................... B29C 73/166
141/38

(Continued)

FOREIGN PATENT DOCUMENTS

DE   11 2017 003 798       5/2019
EP       2 497 629          9/2012
(Continued)

OTHER PUBLICATIONS

International Search Report for International Application No. PCT/JP2018/047264 dated Apr. 2, 2019, 2 pages, Japan.

*Primary Examiner* — Jason K Niesz
(74) *Attorney, Agent, or Firm* — Thorpe North & Western

(57) ABSTRACT

A puncture repair fluid container includes: a container body including a storage portion for storing a puncture repair fluid and an opening portion provided at one end of the storage portion; and a cap mounted to the opening portion. The cap includes an introduction path for introducing compressed air from outside; a discharge path for discharging the puncture repair fluid to the outside; a switching valve for switching two paths disposed between the introduction path and the discharge path; and a switching knob for operating the switching valve. A jig for rotating the switching knob is provided, the switching knob is provided with a recessed portion or protruding portion, and the jig is configured to be attachable and detachable to the switching knob, the jig being provided with a protruding portion or recessed portion that is fitted in or to the recessed portion or protruding portion of the switching knob.

2 Claims, 10 Drawing Sheets

(51) Int. Cl.
 *B29C 73/24* (2006.01)
 *B29L 30/00* (2006.01)
(58) Field of Classification Search
 USPC .......................................................... 141/38
 See application file for complete search history.

(56) References Cited

U.S. PATENT DOCUMENTS

| | | | |
|---|---|---|---|
| 2013/0138146 A1* | 5/2013 | Kojima | B60S 5/04 |
| | | | 606/213 |
| 2016/0136906 A1 | 5/2016 | Chou | |
| 2019/0152172 A1 | 5/2019 | Sekiguchi | |
| 2020/0180247 A1 | 6/2020 | Sekiguchi | |

FOREIGN PATENT DOCUMENTS

| | | | | |
|---|---|---|---|---|
| JP | 2007144876 A * | 6/2007 | ........... | B29C 73/166 |
| JP | 2016-097683 | 5/2016 | | |
| JP | 3212106 | 8/2017 | | |
| JP | 2017-177389 | 10/2017 | | |
| WO | WO-2009065653 A1 * | 5/2009 | ........... | B29C 73/166 |
| WO | WO 2011/055633 | 5/2011 | | |
| WO | WO 2017/169538 | 10/2017 | | |
| WO | WO 2018/020962 | 2/2018 | | |

* cited by examiner

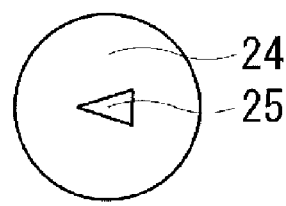
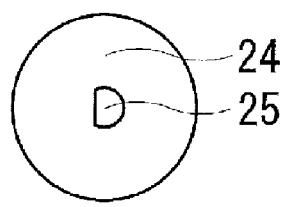
FIG. 7A        FIG. 7B
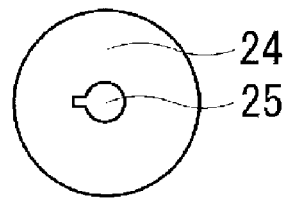
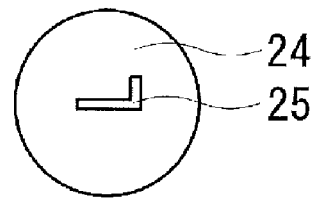
FIG. 7C        FIG. 7D
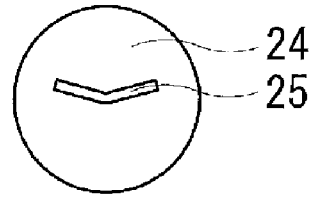
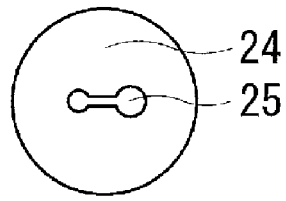
FIG. 7E        FIG. 7F
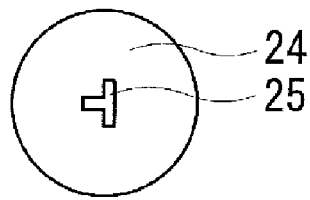
FIG. 7G

PUNCTURE REPAIR FLUID CONTAINER AND PUNCTURE REPAIR KIT

TECHNICAL FIELD

The present technology relates to a puncture repair fluid container and a puncture repair kit and more specifically to a puncture repair fluid container and a puncture repair kit that enable a switching knob to rotate easily at the time of puncture repair work by devising a shape of the switching knob.

BACKGROUND ART

In recent years, when a tire mounted on a vehicle is punctured, a puncture repair fluid is injected into the tire via a tire valve to temporarily repair the puncture. Examples of a device that allows such a temporary repair include a puncture repair kit. Employing a puncture repair kit eliminates the need to provide the vehicle with a spare tire, which makes it possible to save resources and reduce the weight of the vehicle. There is also a further advantage that the space in the vehicle where the spare tire would have been provided can be used for other purposes.

Known puncture repair kits include, for example, a so-called pump-type puncture repair kit that injects a puncture repair fluid stored in a puncture repair fluid container into a tire by compressed air supplied from an air compressor or the like (refer to Japan Unexamined Patent Publication No. 2017-177389, for example). A puncture repair fluid container used in such a pump-type puncture repair kit includes: a container body including a storage portion that stores the puncture repair fluid and an opening portion provided at one end of the storage portion; and a cap mounted to the opening portion of the container body. Further, an introduction path that introduces compressed air from the outside and a discharge path that discharges the puncture repair fluid to the outside are provided is provided to the cap. Further, in some cases, a flow path that allows only compressed air to pass therethrough between the introduction path and the discharge path; and a flow path that sends out the puncture repair fluid together with the compressed air are disposed in the cap, and a switching valve that switches the two flow paths is provided. In a case of such a puncture repair fluid container, there arises a problem in that a switching knob for operating the switching valve is less likely to rotate when the hermeticity of the switching valve is high. Also, when the switching knob itself is increased in size, the switching knob is easy to grip, which is advantageous in rotating the switching knob. However, when the switching knob itself is increased in size, there is a problem of storage and cost performance being deteriorated.

SUMMARY

The present technology provides a puncture repair fluid container and a puncture repair kit that enable a switching knob to rotate easily at the time of puncture repair work by devising a shape of the switching knob.

A puncture repair fluid container includes: a container body including a storage portion for storing a puncture repair fluid and an opening portion provided at one end of the storage portion; and a cap being mounted to the opening portion, the cap including: an introduction path for introducing compressed air from outside; a discharge path for discharging the puncture repair fluid to the outside; a switching valve for switching two paths disposed between the introduction path and the discharge path; and a switching knob for operating the switching valve. A jig for rotating the switching knob is provided, the switching knob being provided with a recessed portion or protruding portion, and the jig is configured to be attachable and detachable to the switching knob, the jig being provided with a protruding portion or recessed portion that is fitted in or to the recessed portion or protruding portion of the switching knob.

A puncture repair kit includes: the container for storing the puncture repair fluid described above; a hose for introducing the puncture repair fluid into a tire, the hose being connected to the container; a compressor for supplying compressed air for feeding the puncture repair fluid in the container through the hose; and a casing capable of housing the container and the compressor. The recessed portion or protruding portion of the switching knob and the protruding portion or recessed portion of the jig each has a non-circular shape having directionality in a plan view. A rotation start position and a rotation end position of the jig are indicated on a surface of the casing. Under a state in which the jig is mounted to the switching knob, a gripping portion provided to the jig extends to the rotation start position. The jig rotates from the rotation start position to the rotation end position.

A puncture repair kit includes the container for storing the puncture repair fluid described above, a hose for introducing the puncture repair fluid into a tire, the hose being connected to the container; and a compressor for supplying compressed air for feeding the puncture repair fluid in the container through the hose. A cable winder for winding a power cable is provided, the cable winder being provided with a protruding portion or recessed portion that is fitted in or to the recessed portion or protruding portion of the switching knob, and the cable winder as the jig is configured to be engageable with the switching knob.

In present technology, the jig for rotating the switching knob is included, and the switching knob is provided with the recessed portion or protruding portion. The jig includes a protruding portion or recessed portion that is fitted in or to the recessed portion or protruding portion of the switching knob and is attachable and detachable to the switching knob. Thus, without increasing the entire switching knob in size, the switching knob can be rotated easily with the jig.

BRIEF DESCRIPTION OF DRAWINGS

FIG. 5A is a cross-sectional view of a switching knob and a jig, and FIG. 5B is a plan view of the switching knob.

FIG. 6A is a cross-sectional view of the switching knob and the jig, and FIG. 6B is a plan view of the switching knob.

FIGS. 7A to 7G illustrate other modification examples of the switching knob of the puncture repair fluid container according to the embodiment of the present technology. The modified examples are in plan views.

FIG. 8A is a plan view, and FIG. 8B is a cross-sectional view taken along the puncture repair kit in an extension direction.

FIG. 9A is a front view of the cable winder, and FIG. 9B is an explanatory view of mounting the cable winder to the switching knob.

FIG. 10A is a front view of the cable winder, and FIG. 10B is an explanatory view of mounting the cable winder to the switching knob.

DETAILED DESCRIPTION

Figure 3:
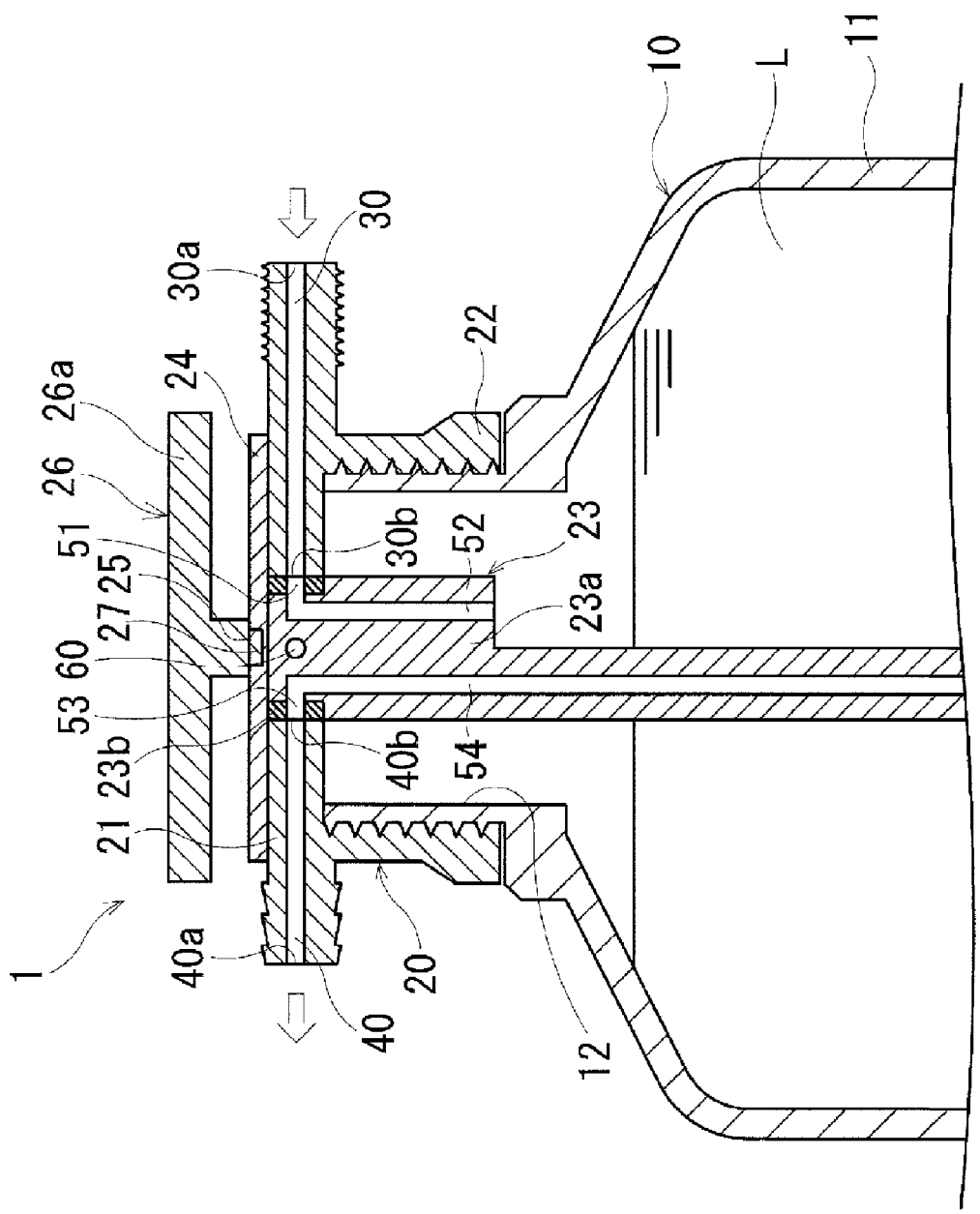
FIG. 3 is an enlarged view of a region at or near a cap, illustrating one example of a state in which a first flow path of the puncture repair fluid container in FIG. 1 is released.
Figure 4:
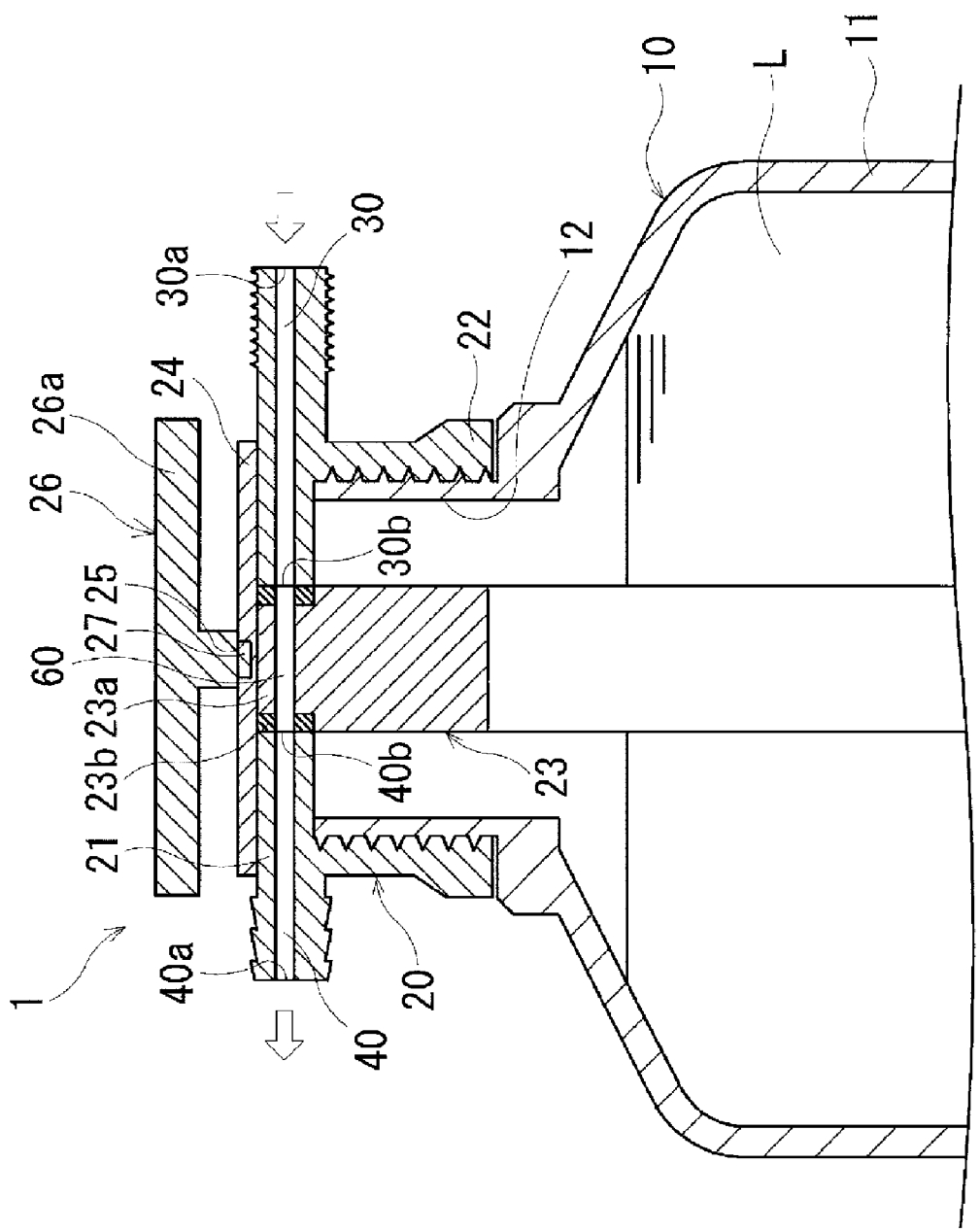
FIG. 4 is an enlarged view of the region at or near the cap, illustrating one example of a state in which a second flow path of the puncture repair fluid container in FIG. 1 is released.
Figure 5A:
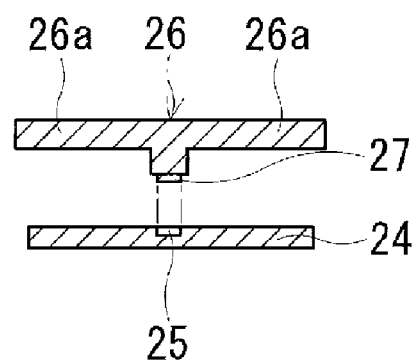
FIGS. 5A and 5B illustrate a part of the cap of the puncture repair fluid container in FIG. 1.
Figure 5B:
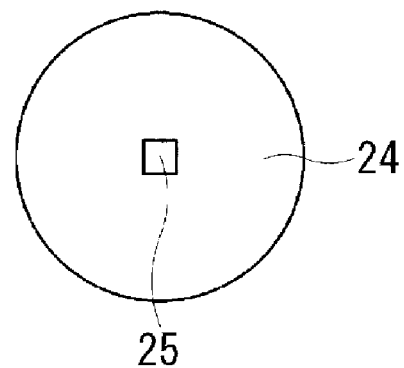

Configurations of embodiments of the present technology will be described in detail below with reference to the accompanying drawings. FIGS. 1 to 4 illustrate a puncture repair fluid container according to an embodiment of the present technology. FIGS. 5A and 5B illustrate a part of a cap of the puncture repair fluid container according to the embodiment of the present technology.

Figure 1:
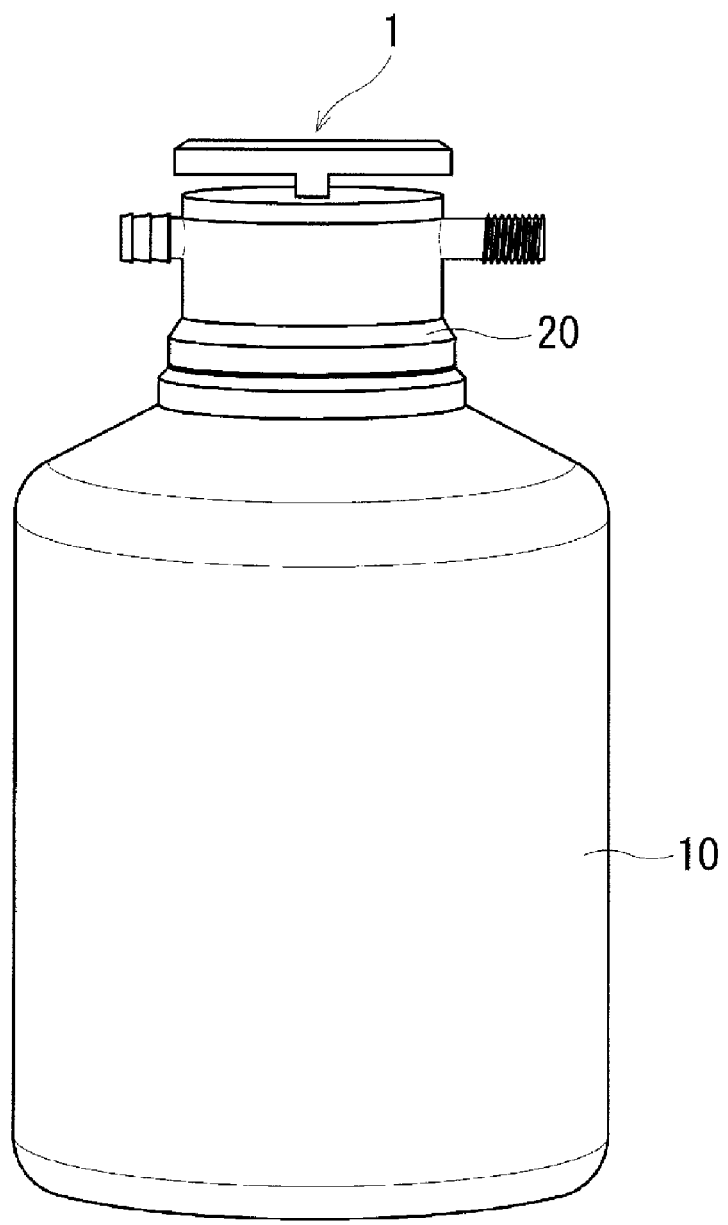
FIG. 1 is a perspective view illustrating one example of a puncture repair fluid container according to an embodiment of the present technology.
Figure 2:
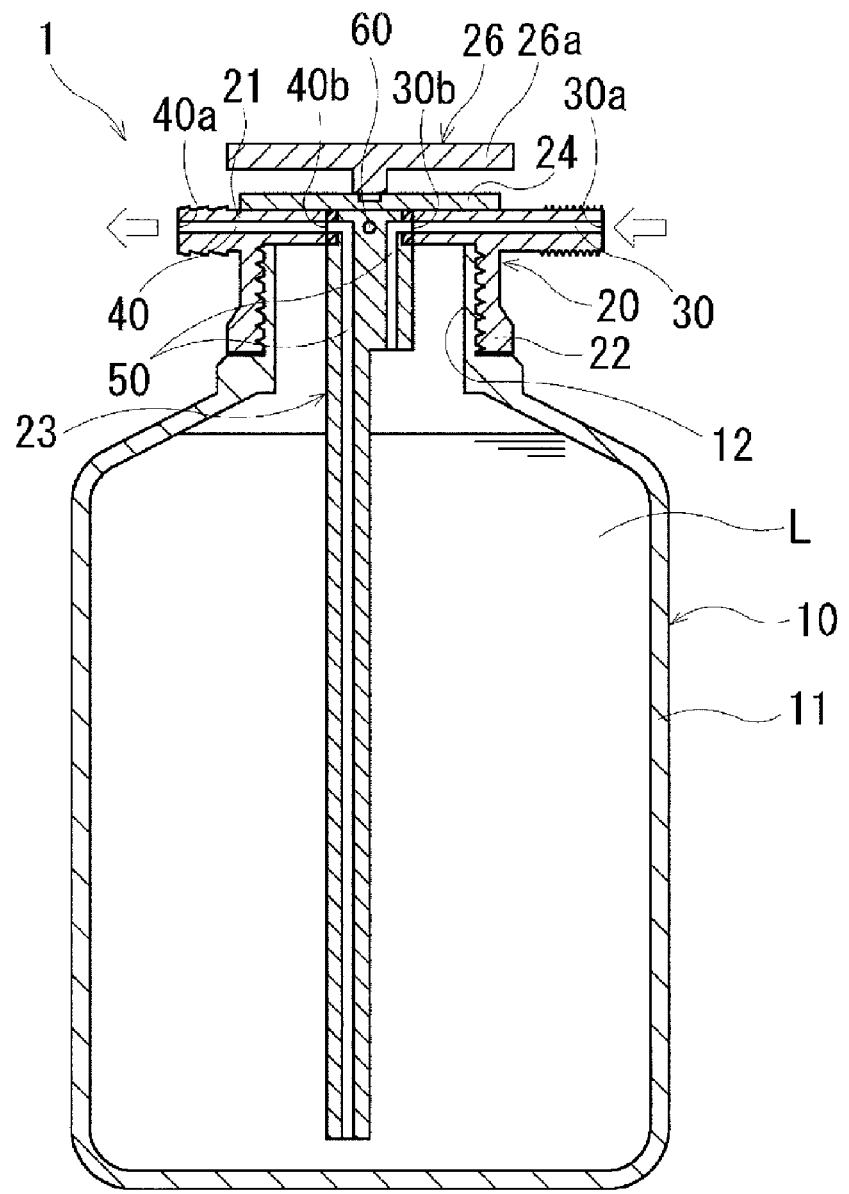
FIG. 2 is a cross-sectional view of the puncture repair fluid container in FIG. 1.

As illustrated in FIGS. 1 2, a puncture repair fluid container 1 (hereinafter, referred to as "container 1") according to the present technology includes a container body 10 and a cap 20. A hose that connects the container 1 to a high-pressure air feed device and a hose that connects the container 1 to a tire are not particularly limited in the present technology, and hence detailed description therefor is omitted in FIGS. 1 and 2.

As illustrated in FIGS. 1 and 2, the container body 10 includes: a storage portion 11 having a cylindrical shape that stores a puncture repair fluid L containing, for example, rubber latex; and an opening portion 12 having a cylindrical shape that is positioned on a side of an upper part of the storage portion 11 when the container body 10 stands upright and that discharges the puncture repair fluid L at the time of use. When the container 1 stands upright, a bottom surface of the storage portion 11 is positioned on a side opposite the opening portion 12. In the present embodiment, a screw thread is formed on an outer circumferential surface of the opening portion 12, which allows engagement with a screw thread on the cap 20 described later. The storage portion 11 and the opening portion 12 are integrally formed of, for example, a synthetic resin such as polypropylene or polyethylene. The opening portion 12 may be sealed with, for example, a film (not illustrated) before the cap 20 is mounted to prevent the deterioration of the puncture repair fluid L and leakage from the opening portion 12.

The cap 20 includes a cap body 21, a mounting portion 22, a switching valve 23, and a switching knob 24. The cap body 21 having a substantially cylindrical shape is provided with an introduction path 30 that introduces compressed air from the outside of the container 1 and a discharge path 40 that discharges the puncture repair fluid L in the container 1. The mounting portion 22 has a substantially cylindrical shape having the same outer diameter as that of the cap body 21, and the screw thread that is engaged with the screw thread on the opening portion 12 is formed on an inner circumferential surface.

The introduction path 30 is a flow path that extends in the cap body 21 in a direction orthogonal to an axis of the container 1. The introduction path 30 has an opening end 30a that opens to the outside of the container 1 and an opening end 30b that opens to the inside of the cap 20 (the cap body 21). The opening end 30a of the introduction path 30 protrudes from the cap body 21 and has a shape that enables coupling with the hose for connecting the container 1 to the feed device.

The discharge path 40 is a flow path that extends in the cap body 21 in the direction orthogonal to the axis of the container 1. The discharge path 40 has an opening end 40a that opens to the outside of the container 1 and an opening end 40b that opens to the inside of the cap 20 (the cap body 21). The opening end 40a of the discharge path 40 protrudes from the cap body 21 and has a shape that enables coupling with the hose for connecting the container 1 to the tire.

The switching valve 23 is a valve for switching the two flow paths disposed between the introduction path 30 and the discharge path 40. The switching valve 23 includes a valve body 23a having a columnar shape and a sealing body 23b having a cylindrical shape that exerts sealability. An annular groove is provided in an outer circumferential surface of the valve body 23a so that the sealing body 23b is fitted therein. The sealing body 23b is fitted in this groove to obtain the switching valve 23. As the material of the sealing body 23b, rubber is exemplified. A first flow path 50 and a second flow path 60 are provided to the valve body 23a and the sealing body 23b, respectively. Both the first flow path 50 and the second flow path 60 pass through the valve body 23a and the sealing body 23b.

The first flow path 50 is a flow path for sending the puncture repair fluid L together with compressed air between the introduction path 30 and the discharge path 40. As illustrated in FIG. 3, the first flow path 50 includes: straight portions 51 and 53 that extend in the direction orthogonal to the axis of the container 1; and branch portions 52 and 54 that extend from ends of the straight portions 51 and 53 in the axial direction of the container 1. The other ends of the straight portions 51 and 53 have a shape that enables coupling with the opening end 30b of the introduction path 30 and the opening end 40b of the discharge path 40, respectively. The branch portion 54 extends to the inside of the container body 10 and reaches a region at or near the bottom surface of the container body 10 (the storage portion 11). At the time of puncture repair work, the puncture repair fluid L is sent to the discharge path 40 via the branch portion 54. Further, instead of causing the branch portion 54 to extend to the region at or near the bottom surface of the container body 10, a tube extending to the inside of the container body 10 may be mounted. In this case, the material of the tube is not particularly limited, and polyvinyl chloride and soft polyethylene are exemplified.

The second flow path 60 is a flow path that allows only compressed air to pass therethrough between the introduction path 30 and the discharge path 40. As illustrated in FIG. 4, the second flow path 60 is a flow path that extends in the valve body 23a and the sealing body 23b in the direction orthogonal to the axis of the container 1. The second flow path 60 has one end capable of being coupled to the opening end 30b of the introduction path 30 and the other end capable of being coupled to the opening end 40b of the discharge path 40.

The switching knob 24 is a disk-like gripping member for operating the switching valve 23. As illustrated in FIGS. 5A and 5B, the surface of the switching knob 24 is provided with at least one recessed portion or protruding portion 25 (in FIGS. 5A and 5B, the recessed portion). The container 1 includes a jig 26 that is fitted in or to the recessed portion or protruding portion 25 of the switching knob 24 and rotates the switching knob 24. The jig 26 is provided with a protruding portion or recessed portion 27 (in FIGS. 5A and 5B, the protruding portion) that is fitted in or to the recessed portion or protruding portion 25 of the switching knob 24. The jig 26 includes a gripping portion 26a being a portion to be gripped. The jig 26 described above is attachable and detachable to the switching knob 24. Note that, in the embodiment in FIGS. 1 to 4 and FIG. 5A, the example in which the jig 26 has a T-like shape in a cross-sectional view is given, but the shape of the jig 26 is not particularly limited. A jig having an L-like shape in a cross-sectional view or a freely selected shape may be adopted.

When puncture repair work is performed through use of the container 1 described above, the jig 26 mounted to the switching knob 24 is operated to rotate the switching valve 23. With this, switching between the first flow path 50 and the second flow path 60 can be performed. That is, switching between a state in which the first flow path 50 is released (the state in FIG. 3) and a state in which the second flow path 60 is released (the state in FIG. 4) is performed. At the time of storing the container 1, the second flow path 60 remains released. Thus, at the time of performing puncture repair work, the jig 26 is operated to release the first flow path 50. With this, the puncture repair fluid L can be sent to the discharge path 40 together with compressed air.

In the puncture repair fluid container described above, the jig 26 for rotating the switching knob 24 is included, and the switching knob 24 is provided with the recessed portion or protruding portion 25. The jig 26 includes the protruding portion or recessed portion 27 that is fitted in or to the recessed portion or protruding portion 25 of the switching knob 24 and is attachable and detachable to the switching knob 24. Thus, without increasing the entire switching knob 24 in size, the switching knob 24 can be rotated easily with the jig 26.

Figure 6A:
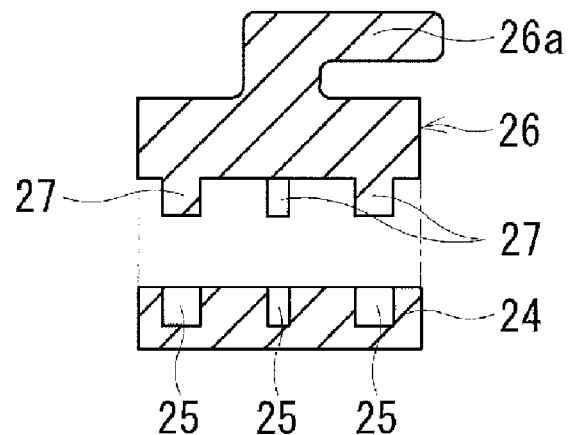
FIGS. 6A and 6B illustrate a modification example of a part of the cap of the puncture repair fluid container according to the embodiment of the present technology.
Figure 6B:
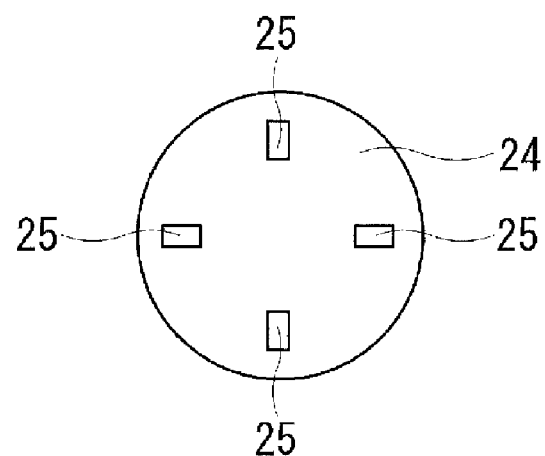

FIGS. 6A and 6B illustrate a modification example of a part of the cap of the puncture repair fluid container according to the embodiment of the present technology. As illustrated in FIGS. 6A and 6B, the surface of the switching knob 24 is provided with four recessed portions or protruding portions 25 (in FIGS. 6A and 6B, the recessed portions). At the same time, the jig 26 is provided with protruding portions or recessed portions 27 (in FIGS. 6A and 6B, the protruding portions) that are respectively fitted in or to the recessed portions or protruding portions 25 of the switching knob 24. The jig 26 is provided with the gripping portion 26a having an L-like shape in a cross-sectional view. In the embodiment in FIGS. 5A and 5B and FIGS. 6A and 6B, the examples in which one or more of the recessed portions are formed in the switching knob 24 and one or more of the protruding portions are formed on the jig 26 are given, but the present technology is not limited thereto. One or more of the protruding portions may be formed on the switching knob 24, and one or more of the recessed portions that are fitted to the one or more of the protruding portions of the switching knob 24 may be formed in the jig 26.

FIGS. 7A to 7G illustrate other modification examples of the switching knob of the puncture repair fluid container according to the embodiment of the present technology. In addition to the shapes illustrated in FIGS. 5B and 6B, the recessed portion or protruding portion 25 of the switching knob 24 may have a non-circular shape having directionality in a plan view, as illustrated in FIGS. 7A to 7G. Specifically, as illustrated in FIG. 7A, a case of a triangular shape may be given. As illustrated in FIG. 7B, a case of a partially cut circular shape may be given. As illustrated in FIG. 7C, a case of a circular shape having a protruding part may be given. Further, as illustrated in FIG. 7D, a case of an L-like shape may be given. As illustrated in FIG. 7E, a case of a shape in which the center of the recessed portion or protruding portion 25 is bent may be given. As illustrated in FIG. 7F, a case of a shape in which a part of a larger circle protrudes and a distal end of the protruding part forms a smaller circle may be given. As illustrated in FIG. 7G, a case of a T-like shape may be given. In conformity to the shape of the recessed portion or protruding portion 25 of the switching knob 24, the protruding portion or recessed portion 27 of the jig 26 is formed. As described above, the recessed portion or protruding portion 25 of the switching knob 24 and the protruding portion or recessed portion 27 of the jig 26 each have a non-circular shape having directionality in a plan view. Thus, a mounting direction of the jig 26 with respect to the switching knob 24 is clear, and hence mounting work of the jig 26 can be performed accurately and easily. In contrast, in a case where the recessed portion or protruding portion 25 of the switching knob 24 and the protruding portion or recessed portion 27 of the jig 26 each have a circular shape without directionality in a plan view, a mounting direction of the jig 26 with respect to the switching knob 24 is not determined, which is not preferable.

Figure 8A:
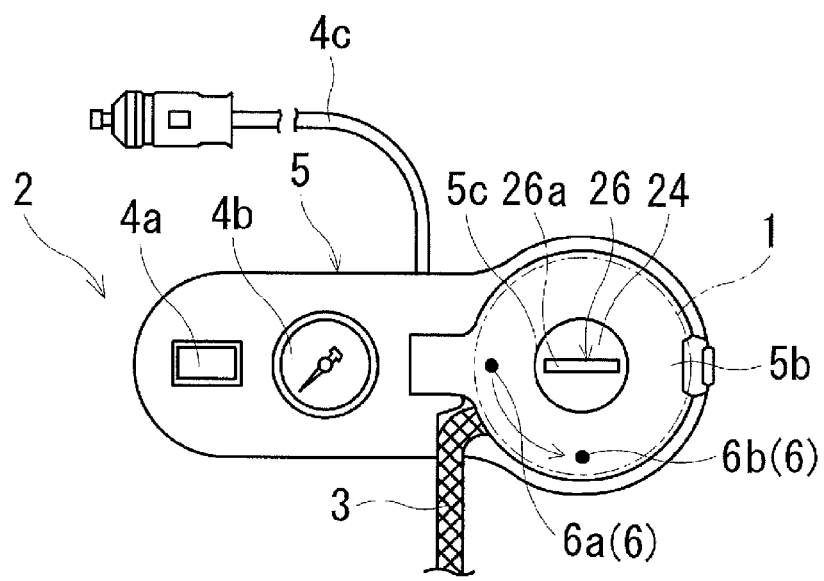
FIGS. 8A and 8B illustrate one example of a puncture repair kit according to an embodiment of the present technology.
Figure 8B:
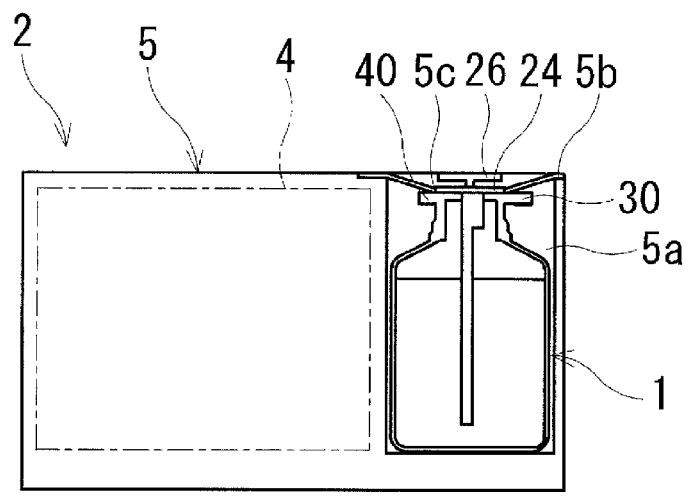

FIGS. 8A and 8B illustrate one example of a puncture repair kit according to an embodiment of the present technology. As illustrated in FIGS. 8A and 8B, a puncture repair kit 2 includes a hose 3 that is connected to the container 1 via the discharge path 40 and that introduces the puncture repair fluid L into a tire; and a compressor 4 that supplies compressed air for feeding the puncture repair fluid L through the hose 3. The compressor 4 is integrally incorporated inside a casing 5. A pressure gauge 4b and a switch 4a of the compressor 4 are disposed on the upper part of the casing 5, and a power cable 4c that is connected to the compressor 4 and supplies electric power is disposed on a side surface of the casing 5. Further, a bottle reception portion 5a for receiving the container 1 and a lid portion 5b for covering the container 1 are formed on the casing 5. The lid portion 5b is mounted to the casing 5 in a swingable manner and has a through-hole 5c at a position corresponding to the switching knob 24. Further, under a state of being received in the bottle reception portion 5a, the container 1 is connected to the compressor 4 via the introduction path 30.

In this embodiment, the recessed portion or protruding portion 25 of the switching knob 24 and the protruding portion or recessed portion 27 of the jig 26 each have a non-circular shape having directionality in a plan view. The surface of the casing 5 is provided with marks 6 indicating a rotation start position 6a and a rotation end position 6b of the jig 26. Under a state of being mounted to the switching knob 24, the jig 26 is disposed so that the gripping portion 26a provided to the jig 26 extends to the rotation start position 6a. The jig 26 rotates from the rotation start position 6a to the rotation end position 6b. As described above, the recessed portion or protruding portion 25 of the switching knob 24 and the protruding portion or recessed portion 27 of the jig 26 have non-circular shapes in conformity to each other, and hence such a mounting direction that the gripping portion 26a extends to the rotation start position 6a is obtained. Thus, the jig 26 can be mounted to the switching knob 24 in a predetermined direction. Further, when the jig 26 is operated at the time of puncture repair work, the rotation direction of the jig 26 is clearly indicated to a worker with the indication of the rotation start position 6a and the rotation end position 6b. Thus, the switching knob 24 can be operated accurately.

Figure 9A:
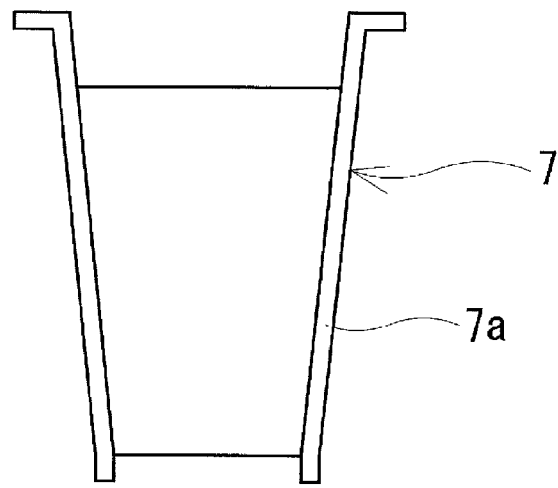
FIGS. 9A and 9B illustrate one example of a cable winder included in the puncture repair kit according to the embodiment of the present technology.
Figure 9B:
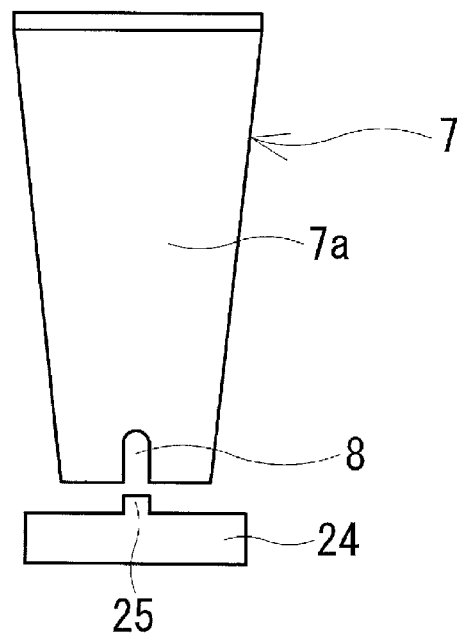
Figure 10A:
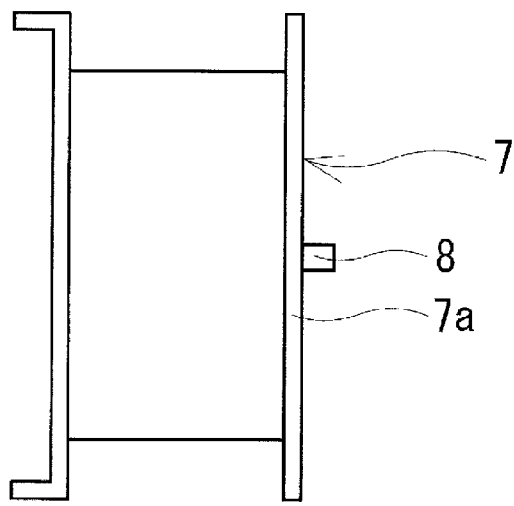
FIGS. 10A and 10B illustrate a modification example of the cable winder included in the puncture repair kit according to the embodiment of the present technology.
Figure 10B:
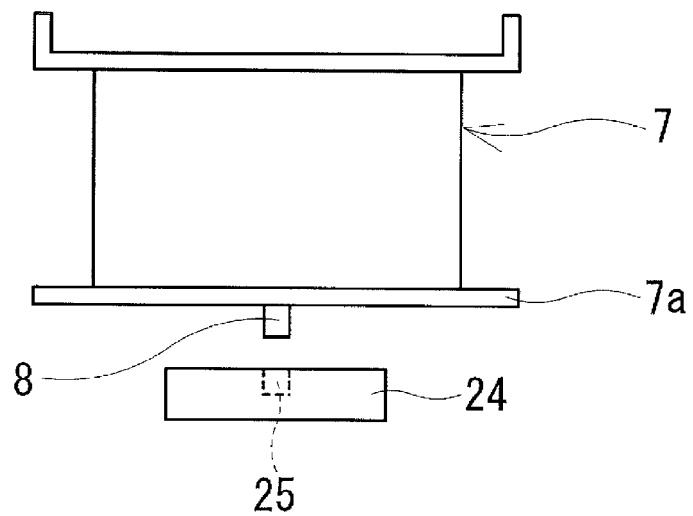

Regarding the puncture repair kit described above, the puncture repair kit 2 may include a cable winder 7 illustrated in FIGS. 9A and 9B and FIGS. 10A and 10B. The cable winder 7 is a housing tool for winding and storing the power cable 4c of the compressor 4. In FIGS. 9A and 9B, a side surface 7a of the cable winder 7 is provided with a protruding portion or recessed portion 8 (in FIG. 9B, the recessed portion) that is fitted in or to the recessed portion or protruding portion 25 of the switching knob 24 (in FIG. 9B, the protruding portion). Further, in FIGS. 10A and 10B, the side surface 7a of the cable winder 7 in another case is provided with the protruding portion or recessed portion 8 (in FIG. 10B, the protruding portion) that is fitted in or to the recessed portion or protruding portion 25 of the switching knob 24 (in FIG. 10B, the recessed portion). In any of the cases, the protruding portion or recessed portion 8 is fitted in or to the recessed portion or protruding portion 25 of the switching knob 24, and the cable winder 7 is configured to be engageable with the switching knob 24. With this configuration, the cable winder 7 can be used in place of the jig 26. With this, for example, in a case where the jig 26 is lost, the cable winder 7 is used as required, which enables the switching knob 24 to rotate easily

The invention claimed is:

1. A puncture repair kit, comprising:
   a puncture repair fluid container, comprising:
   a container body comprising a storage portion for storing a puncture repair fluid and an opening portion provided at one end of the storage portion; and
   a cap being mounted to the opening portion, the cap comprising:
   an introduction path for introducing compressed air from outside;
   a discharge path for discharging the puncture repair fluid to the outside;
   a switching valve for switching two paths disposed between the introduction path and the discharge path; and
   a switching knob for operating the switching valve, wherein
   a jig for rotating the switching knob is provided, the switching knob being provided with a recessed portion or a protruding portion, and
   the jig is configured to be attachable and detachable to the switching knob, the jig being provided with a protruding portion or a recessed portion that is fitted in or to the recessed portion or the protruding portion of the switching knob;
   a hose for introducing the puncture repair fluid into a tire, the hose being connected to the puncture repair fluid container; and
   a compressor for supplying compressed air for feeding the puncture repair fluid in the puncture repair fluid container through the hose, wherein
   the jig comprises a cable winder for winding a power cable, the cable winder being configured to be engageable with the switching knob.

2. The puncture repair kit according to claim 1, further comprising:
   a casing capable of housing the puncture repair fluid container and the compressor, wherein
   the recessed portion or protruding portion of the switching knob and the protruding portion or recessed portion of the jig each has a non-circular shape having directionality in a plan view,
   a rotation start position and a rotation end position of the jig are indicated on a surface of the casing,
   under a state in which the jig is mounted to the switching knob, a gripping portion provided to the jig extends to the rotation start position, and
   the jig rotates from the rotation start position to the rotation end position.

\* \* \* \* \*